US009551316B2

(12) United States Patent
Saavedra

(10) Patent No.: US 9,551,316 B2
(45) Date of Patent: Jan. 24, 2017

(54) DEVICE AND METHOD FOR GENERATING POWER USING BUOYANCY

(71) Applicant: John A. Saavedra, Irmo, SC (US)

(72) Inventor: John A. Saavedra, Irmo, SC (US)

(73) Assignee: LOOK FOR THE POWER, LLC, Irmo, SC (US)

( * ) Notice: Subject to any disclaimer, the term of this patent is extended or adjusted under 35 U.S.C. 154(b) by 0 days.

(21) Appl. No.: 15/059,802

(22) Filed: Mar. 3, 2016

(65) Prior Publication Data

US 2016/0208770 A1    Jul. 21, 2016

Related U.S. Application Data

(63) Continuation of application No. 14/600,145, filed on Jan. 20, 2015, now Pat. No. 9,356,489.

(51) Int. Cl.

| | |
|---|---|
| *F03B 17/00* | (2006.01) |
| *F03B 17/02* | (2006.01) |
| *F03G 3/00* | (2006.01) |
| *F03B 11/00* | (2006.01) |
| *F03B 13/10* | (2006.01) |
| *F03B 15/00* | (2006.01) |

(52) U.S. Cl.
CPC .......... *F03B 17/025* (2013.01); *F03B 11/004* (2013.01); *F03B 11/006* (2013.01); *F03B 13/10* (2013.01); *F03B 15/00* (2013.01); *F03B 17/00* (2013.01); *F03G 3/00* (2013.01)

(58) Field of Classification Search
CPC ..................................................... F03B 17/00
USPC ........................................................ 290/54
See application file for complete search history.

(56) References Cited

U.S. PATENT DOCUMENTS

| | | | |
|---|---|---|---|
| 3,515,889 A | 6/1970 | Kammerer | |
| 4,265,599 A * | 5/1981 | Morton | F04F 1/06 417/101 |
| 8,796,877 B2 * | 8/2014 | Shinohara | H02K 57/003 290/54 |
| 8,887,497 B2 * | 11/2014 | Travis | F15B 3/00 60/398 |
| 2006/0091677 A1 * | 5/2006 | Greene | F03B 17/00 290/54 |
| 2007/0085342 A1 | 4/2007 | Horianopoulos et al. | |
| 2007/0284883 A1 * | 12/2007 | Cafariello | F03B 17/04 290/54 |
| 2011/0120109 A1 | 5/2011 | McGillis | |

(Continued)

FOREIGN PATENT DOCUMENTS

GB          001513132 A       6/1978

*Primary Examiner* — Joseph Waks
(74) *Attorney, Agent, or Firm* — Shumaker, Loop & Kendrick, LLP

(57) ABSTRACT

A power generator may generate power using buoyancy having a fluid column contained by a tank having a sealable drain and a piston having a substantially hollow interior capable of being filled with a fluid. The piston has a sealable outlet, a vent, an inlet, and a lateral cross-section that is smaller than a lateral cross-section of the tank. A rod is connected to the piston and a power generator is connected to the rod. The piston operates from a first position near the top of the fluid column to a second position near the bottom of the fluid column. The piston moves from the first position to the second position as fluid is added to the inlet. The piston moves from the second position to the first position as the fluid is drained from the outlet.

20 Claims, 7 Drawing Sheets

(56) References Cited

U.S. PATENT DOCUMENTS

2012/0181790 A1 7/2012 Finnigan et al.
2012/0313373 A1 12/2012 Shin et al.

* cited by examiner

DEVICE AND METHOD FOR GENERATING POWER USING BUOYANCY

CROSS REFERENCE TO RELATED PATENT APPLICATIONS

This application is a continuation of expressly incorporates by reference, and claims the benefit of and priority to co-pending United States application having Ser. No. 14/600,145 filed on Jan. 20, 2015.

TECHNICAL FIELD AND BACKGROUND OF INVENTION

The invention relates generally to the field of power generation. More particularly, the invention relates to the field of generating power and electricity using a body's buoyancy in a fluid.

Buoyancy is an upward force exerted by a fluid opposing the weight of a body immersed in the fluid. Particularly, in a column of fluid, pressure increases with depth as a result of the weight of the overlying fluid. An object submerged in the fluid experiences greater pressure at the bottom of the column than at the top. This difference in pressure results in a net force that tends to accelerate the body upwards. The magnitude of that force is proportional to the difference in the pressure between the top and the bottom of the column, and is also equivalent to the weight of the fluid that would otherwise occupy the column. For this reason, a body whose density is greater than that of the fluid in which it is submerged tends to sink. Likewise, a body whose density is less dense than the liquid or is shaped appropriately will float in the column and to the top of the column of water.

Density is defined as mass divided by volume. Therefore, changing the density of an object can occur by altering either the mass or the volume. When the mass or volume of a submerged object is changed so that it becomes less dense than the fluid (such as water), it will rise to the top of the column of water.

Water, both salt and fresh, is very plentiful on Earth. In many places, columns of water in the form of municipal water tanks are located in urban and suburban as well as rural areas. Likewise, columns of other fluids, such as petroleum or other viscous oils, are located in urban and suburban as well rural areas. These columns of fluids, or tanks, may be located above or below ground and may be subject to constant or periodic filling and refilling. Further, they sometimes comprise reservoirs, lakes, rivers, streams, and the like.

It is common for such tanks to be located adjacent areas of human activity requiring electrical power. For instance, buildings and roadways adjacent the column may utilize electrical power as indeed may the tank itself for heating or lighting purposes. There is a need in the art for new forms of generating electrical power, especially clean electrical power. There is likewise a need in the art for generating and/or providing electrical power adjacent developed areas, such as areas where a fluid-containing tank may be located.

SUMMARY OF THE INVENTION

It is an object of the present invention to provide a power generator that utilizes the buoyancy of a body located in a fluid column to generate electricity or other forms of power, such as pumping water, compressing air, etc. . . . . The words "water" and "fluid" are used interchangeably herein unless specifically indicated otherwise. It is an object of the present invention to provide a piston which operates by rising and sinking in a column of water due to changes in the density of the piston. It is a further object of the invention that the piston is connected to a power generator. As the density is increased, the piston falls. As the density is decreased, the piston rises under the piston's buoyancy against the fluid. The rising piston powers the generator.

These and other aspects of one embodiment of the invention are achieved by providing a power generating apparatus adapted for utilizing buoyancy of a body in a column of fluid. The device may include a fluid column contained by a tank having a sealable drain and a piston, residing inside the tank which has a substantially hollow interior capable of being filled with a fluid. The piston also may have a sealable outlet operating from a closed to an open position located on a bottom portion of the piston and extending through the sealable drain of the tank. The piston may also have a vent located on a top portion of the piston and extending above the top of the fluid column. The piston may also have an inlet operating from a filling position to a non-filling position located on a top portion of the piston. Further, the piston may have a lateral cross-section that is smaller than a lateral cross-section of the tank. The device may also include a rod connected to the piston and extending above the fluid. The device may also include a power generator connected to the rod.

According to such a device, the piston operates from a first position near the top of the fluid column to a second position near the bottom of the fluid column. Further, the piston moves from the first position to the second position as fluid is added to the inlet of the piston, and the piston moves from the second position to the first position as the sealable outlet is actuated from the closed position to the open position.

According to another embodiment of the invention, the piston further comprises ballast that is denser than the fluid.

According to another embodiment of the invention, the power generator includes a hydraulic cylinder connected to the rod, a hydraulic accumulator connected to the hydraulic cylinder, and a hydraulic generator connected to the hydraulic accumulator, wherein as the piston moves from the second position to the first position, the hydraulic cylinder is actuated which actuation charges the hydraulic accumulator with fluid, which charging powers the hydraulic generator creating electric power.

According to another embodiment of the invention, the power generator includes a set of gears operably connected to the rod and to a permanent magnet generator wherein as the piston moves from the second position to the first position, the rod actuates the gears which actuates the permanent magnet generator thereby generating electrical power.

According to another embodiment of the invention, the sealable outlet is arranged to operate from the closed position to the open position as the piston reaches a predetermined position near the bottom of the tank, and wherein the inlet is arranged to operate from the non-filling position to the filling position as the piston reaches a predetermined position near the top of the fluid column.

According to another embodiment of the invention, the fluid in the tank and the fluid used to fill the piston is water.

According to another embodiment of the invention, the fluid in the tank and the fluid used to fill the piston is a petroleum.

According to another embodiment of the invention, the fluid is a viscous oil such as olive oil or vegetable oil and the like.

According to another embodiment of the invention, the sealable outlet, the vent, and the inlet each comprise an extensible water tight conduit.

According to another embodiment of the invention, the water tight conduits each further comprise a storage reel wherein as the piston moves from the first position to the second position, the water tight conduit of the sealable outlet retracts about the reel and the water tight conduits of the inlet and the vent extend from the respective reels, and wherein as the piston moves from the second position to the first position, the water tight conduit of the sealable outlet extends from the real and the water tight conduits of the inlet and the vent retract about the reel.

According to another embodiment of the invention, the piston further comprises a plurality of voids, extending from the bottom of the piston to the top piston, and having an open top and bottom for permitting fluid to flow. The voids facilitate and/or enable the fluid to flow through the piston rather than merely around the piston. Such voids may enable the piston to sink to the bottom of the tank at a faster rate and/or rise to the top of the tank at a faster rate.

According to another embodiment of the invention, the piston is rigid and of sufficient integrity to resist deformation under a pressure exerted by the fluid column when the piston is in the second position.

According to another embodiment of the invention, the piston is deformable such that the volume of the piston is at a largest extent when in the first position and at its smallest extent in the second position. Such a piston may take on the form of an inflatable bag or have bellows allowing for the thermal expansion. The bellows may also expand due to expansion by increased fluid pressure. Importantly, the piston may be insulated to control the movement of heat from the piston to the tank. Further, the bellows may consist of a single flexible panel as a portion of any side of the piston.

According to another embodiment of the invention, the vent is sealable and the fluid used to fill the piston is warmed air which is warmed by a heat exchanger, the warmed air being circulated through a heat exchanger, causing the piston to cycle between the second and first position.

According to another embodiment of the invention, the rod is hingedly attached to the piston.

According to another embodiment of the invention, a pulley may be located at the bottom of the tank. A connecting member such as a rope or chain is connected to the piston, the other end connected to a spool at the top of the tank, maybe inside the tank, but above the fluid level so as to not be submerged. According to such an embodiment, as the piston rises, it pulls the connecting member downward. This movement powers a spool or winch, which then powers a gearset and generator. This gearset has a one-way clutch, Sprag clutch, or ratchet and pawl to rotate only in one direction.

According to another embodiment of the invention, a second hydraulic cylinder is attached to the bottom of the tank. As the piston falls to the second position, the weight of the falling cylinder depresses the second hydraulic cylinder. This second hydraulic cylinder is likewise connected to a second fluid accumulator which is connected to a second hydraulic generator. Alternatively, the second hydraulic cylinder could be attached to the same hydraulic accumulator and hydraulic generator as the primary set which is attached to the rod.

BRIEF DESCRIPTION OF THE DRAWINGS FIGURES

Features, aspects, and advantages of a preferred embodiment of the invention are better understood when the detailed description is read with reference to the accompanying drawing, in which.

DETAILED DESCRIPTION

The present discussion is a description of exemplary embodiments only and is not intended as limiting the broader aspects of the present invention. The following example is provided to further illustrate the invention and is not to be construed to unduly limit the scope of the invention.

Figure 1:
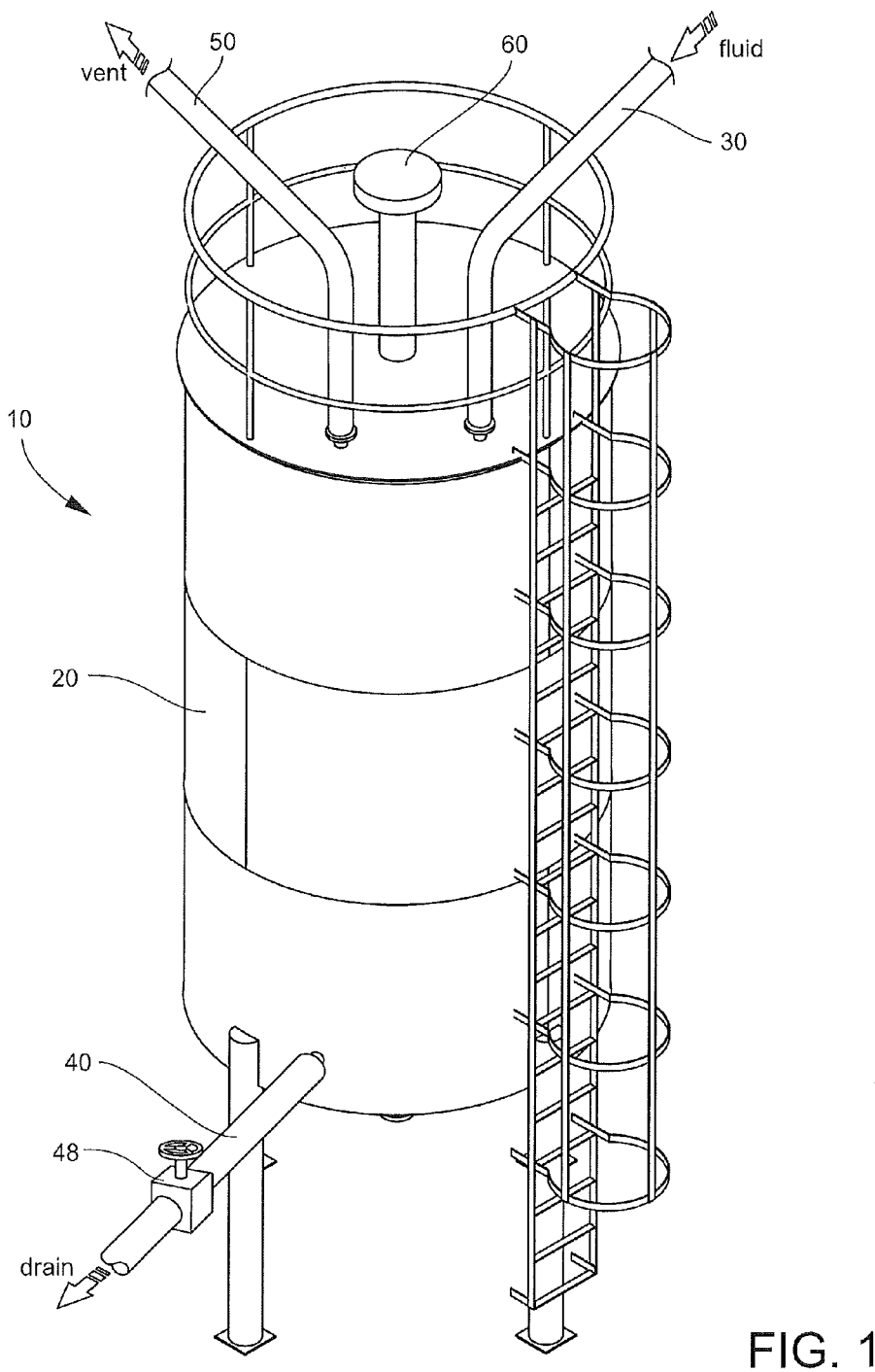
FIG. 1 is a perspective view of the outside of an embodiment of the invention.
Figure 2:
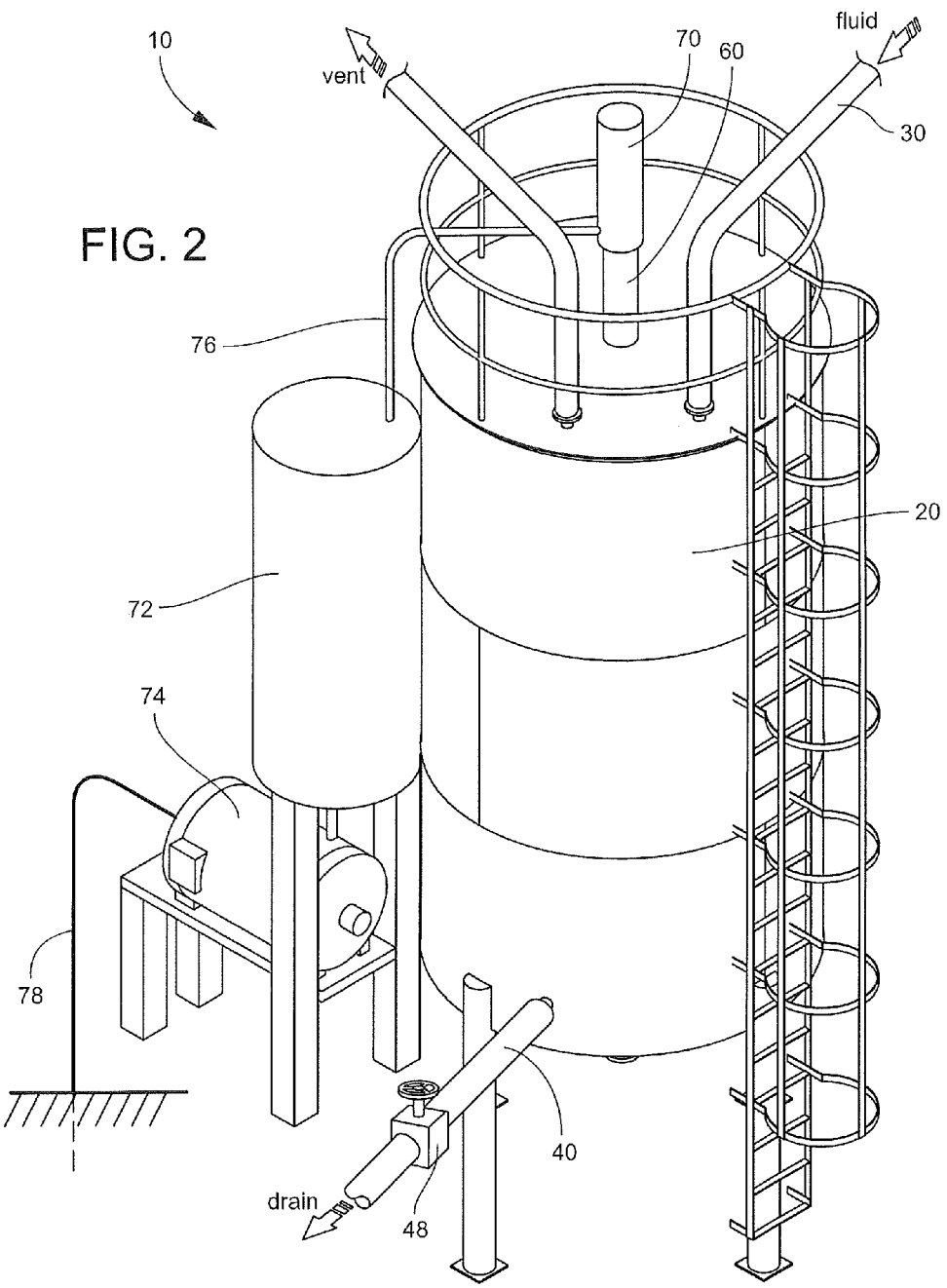
FIG. 2 is a perspective view of the outside of an embodiment of the invention.

Referring to the drawings wherein identical reference numerals denote the same elements throughout the various views, FIGS. 1 and 2 show the outside of the device 10. The device 10 includes a tank 20 which houses a water column and piston (see FIGS. 3-5). The tank 20 is shown as a large municipal type tank but the invention also contemplates small tanks such as 1 gallon and large tanks of over one hundred thousand gallons or more. Indeed, the tank could be a reservoir such as a lake. As shown in FIGS. 1 and 2, a vent 50 extends from the top of the tank 20. A fluid inlet 30 extends from the top of the tank 20. A drain or fluid outlet 40 extends from the bottom of the tank 20. The outlet 40 has a shutoff valve 48 which actuates by opening and closing the outlet 40.

As shown in FIG. 1, a rod 60 extends from the top of the tank. Alternatively, the rod may be housed in the tank (not shown). As shown in FIG. 2, the Rod may be connected to a hydraulic cylinder 70. The hydraulic cylinder 70 may be stationary. The hydraulic cylinder 70 is connected via hydraulic conduit 76 to a hydraulic accumulator 72. The hydraulic accumulator 72 is connected to a hydraulic generator 74 by hydraulic conduit. The hydraulic generator 74 generates electrical power and may be attached to a power grid 78 or charge a battery (not shown).

Figure 3:
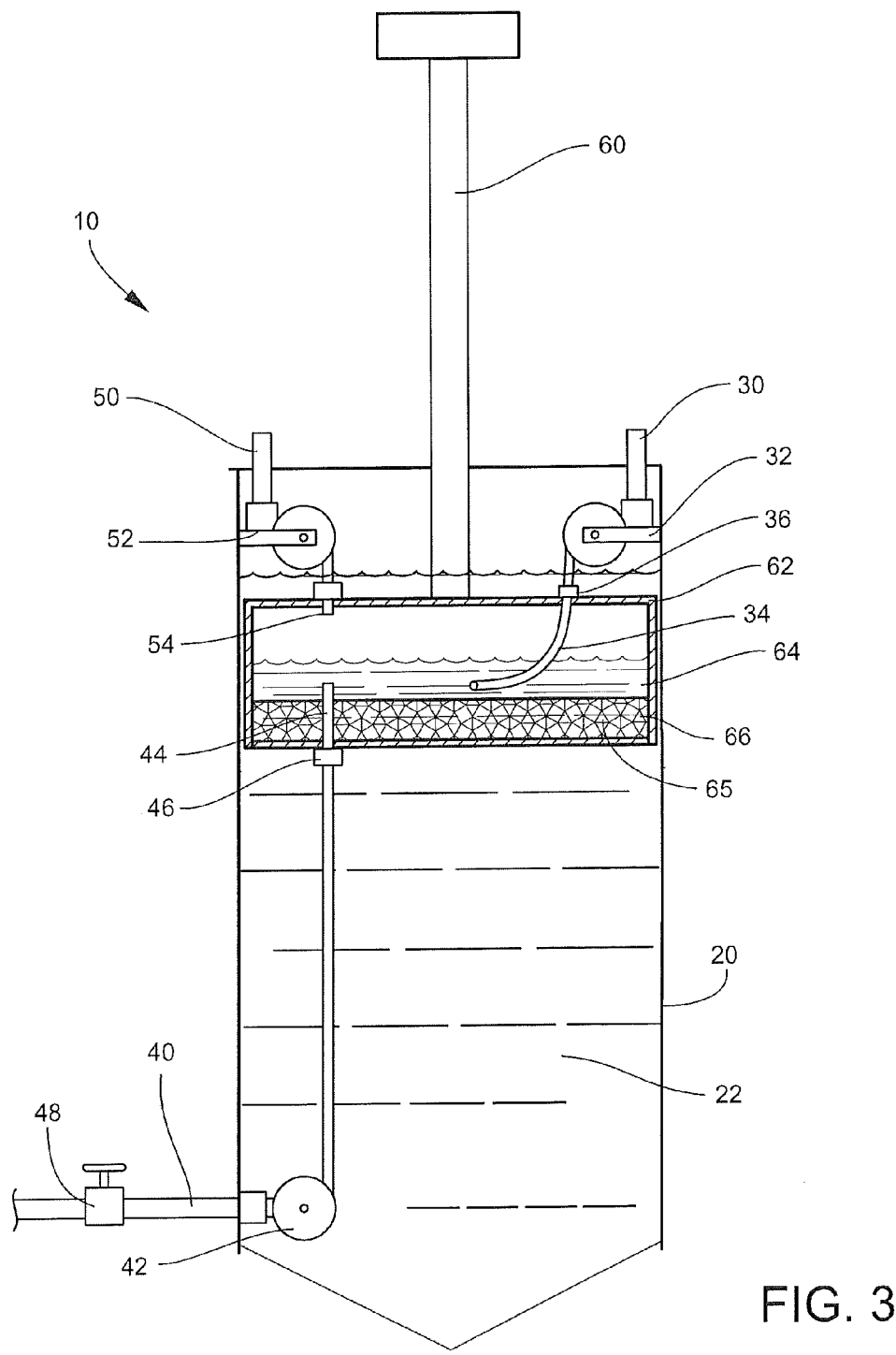
FIG. 3 is a section view of an embodiment of the invention showing the piston in the first position.

As shown in FIG. 3, the tank 20 is filled with a fluid 22. The tank 20 is shown as being cylindrical in shape, having a circular cross section but the invention contemplates that the tank 20 may be a different shape having square, rectangular, or other shaped cross section.

Figure 4:
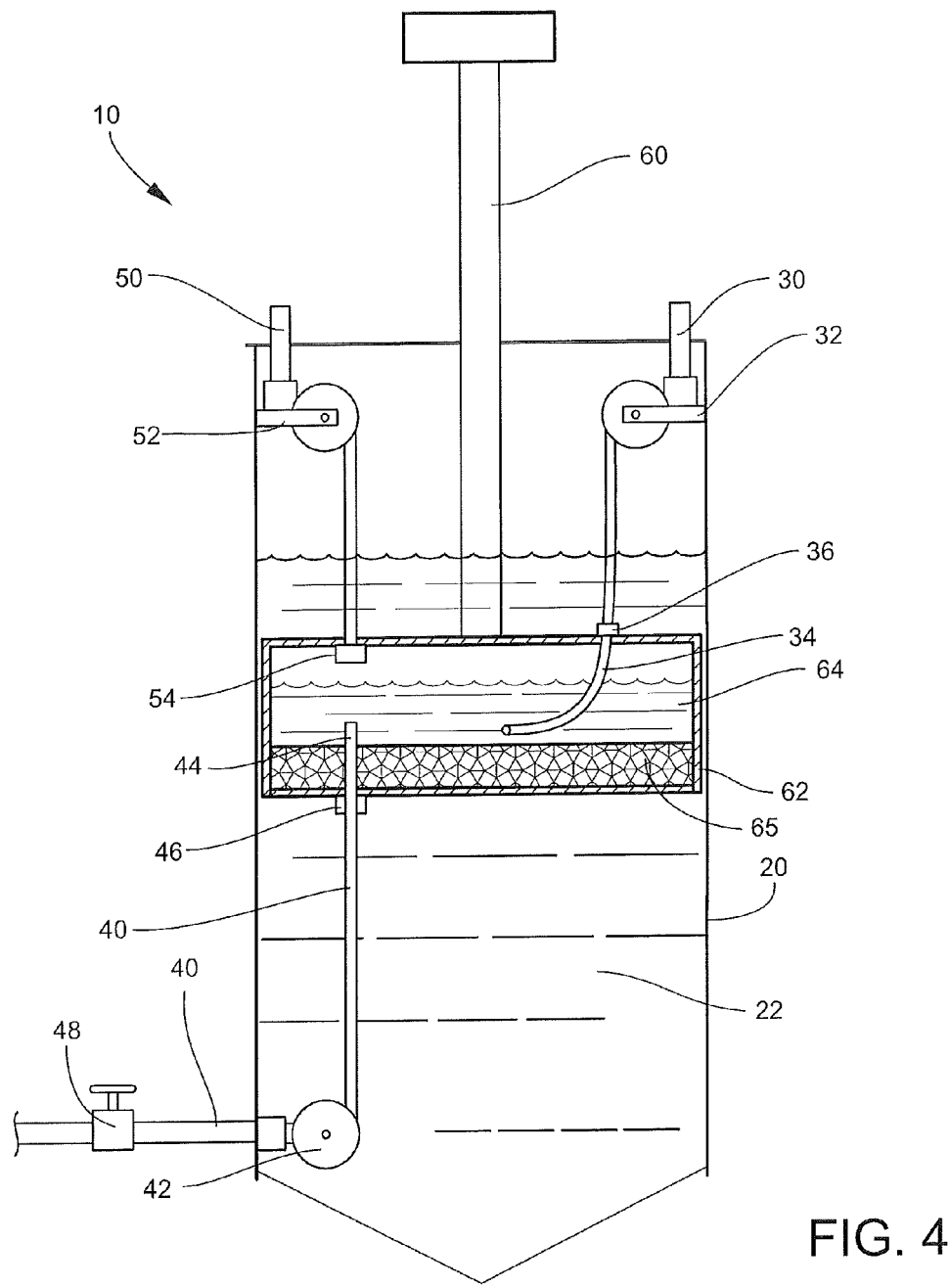
FIG. 4 is a section view of an embodiment of the invention showing the piston in a position between the first position and the second position.
Figure 5:
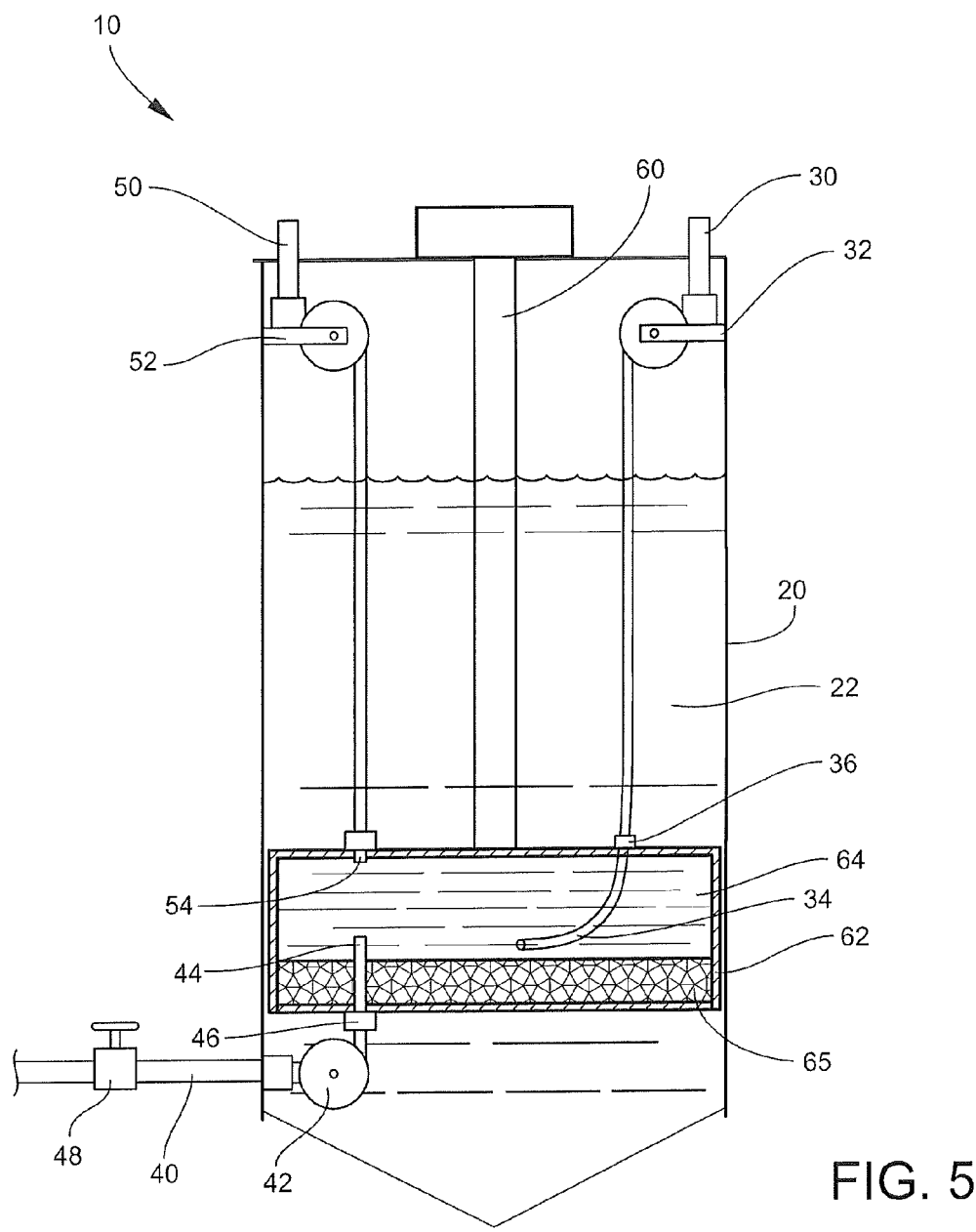
FIG. 5 is a section view of an embodiment of the invention showing the piston in the second position.

FIGS. 3-5 show a section view of the device 10. The piston 62 operates inside the tank 20 which is filled with a fluid 22. The piston 62 could be larger or smaller than shown in the drawings. The piston 62 has a cross-section that is slightly smaller than the cross-section of the tank 20, as shown. The cross-section of the piston 62 has the same shape as the cross-section of the tank 20. The piston 62 has a buoyancy that allows it to float inside the tank 20. The piston 62 is substantially hollow but may be filled with a fluid 64. The fluid 64 may be the same fluid as that fluid 22 which fills the tank 20 or the respective fluids may differ. Indeed, the fluid of the piston may comprise both a first fluid 64 and air. The piston 62 may also have an amount of ballast 65 at the lower portion of the piston 62. The ballast 65 may be removable from the piston 62.

The vent 50 is attached to the piston 62 via a sealable connection 54. The vent 50 may be made of a conduit which may be housed on a reel 52 as shown in FIGS. 3-5.

The inlet 30 is attached to the piston 62 via a sealable/closeable connection 34. The inlet 30 may be made of a conduit which may be housed on a real 32 as shown in FIGS. 3-5. The conduit of the inlet 30 and the sealable/closeable connection 34 are watertight at pressures present at the bottom of the tank 20 when the tank 20 is filled with a fluid 22 as shown in FIG. 5.

The outlet 40 is attached to the piston 62 at connection 46. The outlet may be made of a conduit which may be housed on a reel 42 as shown in FIGS. 3-5. The conduit of the outlet 40 and the connection 46 are watertight at pressures present at the bottom of the tank 20 when the tank 20 is filled with a fluid 22. The outlet 40 includes closeable valve 48 and may include extension portion 44 which extends past the ballast 65 into the substantially hollow portion of the piston 62.

The substantially hollow portion of the piston 62 is designed to be filled with a fluid such as water or oil. The fluid enters the piston 62 via the inlet 30. The piston 62 operates from a first position as shown in FIG. 3 to a second position as shown in FIG. 5. An intermediate position is shown in FIG. 4. As shown in FIG. 3, only a small amount of fluid 64 is contained in the piston 62. As the fluid level 64 increases inside the piston 62, the density of the piston 62 increases. As the density of the piston 62 increases, the piston 62 no longer floats in the fluid 22 of the tank 20 and begins to sink towards the bottom of the tank 20 as shown in FIG. 4. The fluid level 64 of the piston 62 of FIG. 4 is higher than in FIG. 3.

As shown in FIG. 5, the fluid level 64 of the piston 62 is at its maximum and the piston 62 resides near the bottom of the tank 20, having sunk in the fluid column 22.

Once the piston 62 has sunken to the bottom of the fluid column 22 of the tank 20, the valve 48 of the outlet 40 may be actuated from the closed to the open position. This actuation will allow the fluid 64 of the piston 62 to drain from the piston 62. The exiting fluid may be returned into the tank 20 or may be housed in a reservoir (not shown) for later use in filling the piston 62. If the fluid 64 is water from or destined for a municipal water supply, the fluid may enter the municipal water supply as it is drained from the piston 62.

As the fluid 64 is drained from the piston 62, air enters the piston 62 via the inlet 50. The piston 62 will eventually comprise more air and less fluid 64 causing the piston 62 to rise inside the tank 20. As the piston 62 rises, the rod 60 rises with the piston 62.

The rise of the rod 60 may be used to power a generator. The rod 60 could be attached to a permanent magnet generator (or alternator) (not shown) via appropriate gearing or transmission (not shown). The rod 60 could also be used to charge a hydraulic accumulator 72 with hydraulic fluid as shown in FIG. 2. As the pressure in the hydraulic accumulator builds it is released to power a hydraulic generator 74 which may provide electrical energy. The electrical energy may provide power to a power grid, may power lighting and other fixtures associated with the tank 20 or tank location, or may charge batteries.

Figure 6:
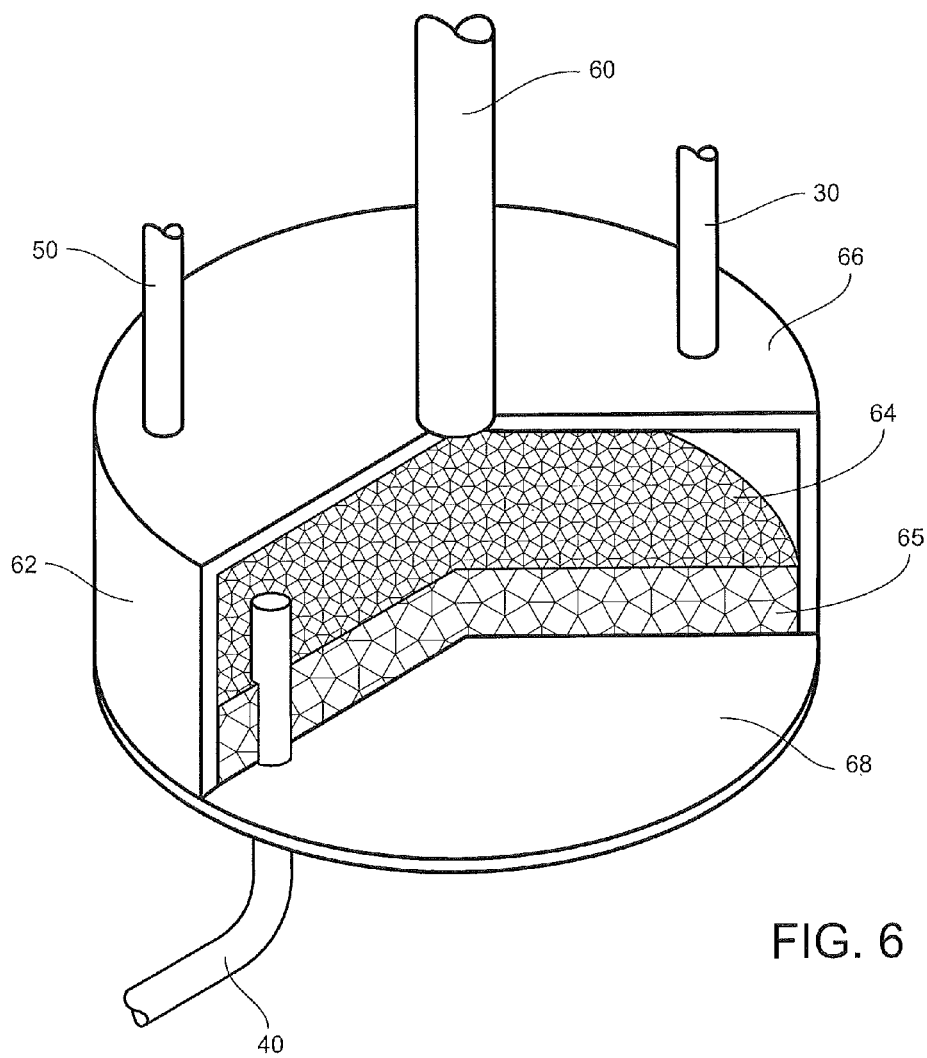
FIG. 6 is a cutaway view of the piston showing an embodiment of the piston without voids.
Figure 7:
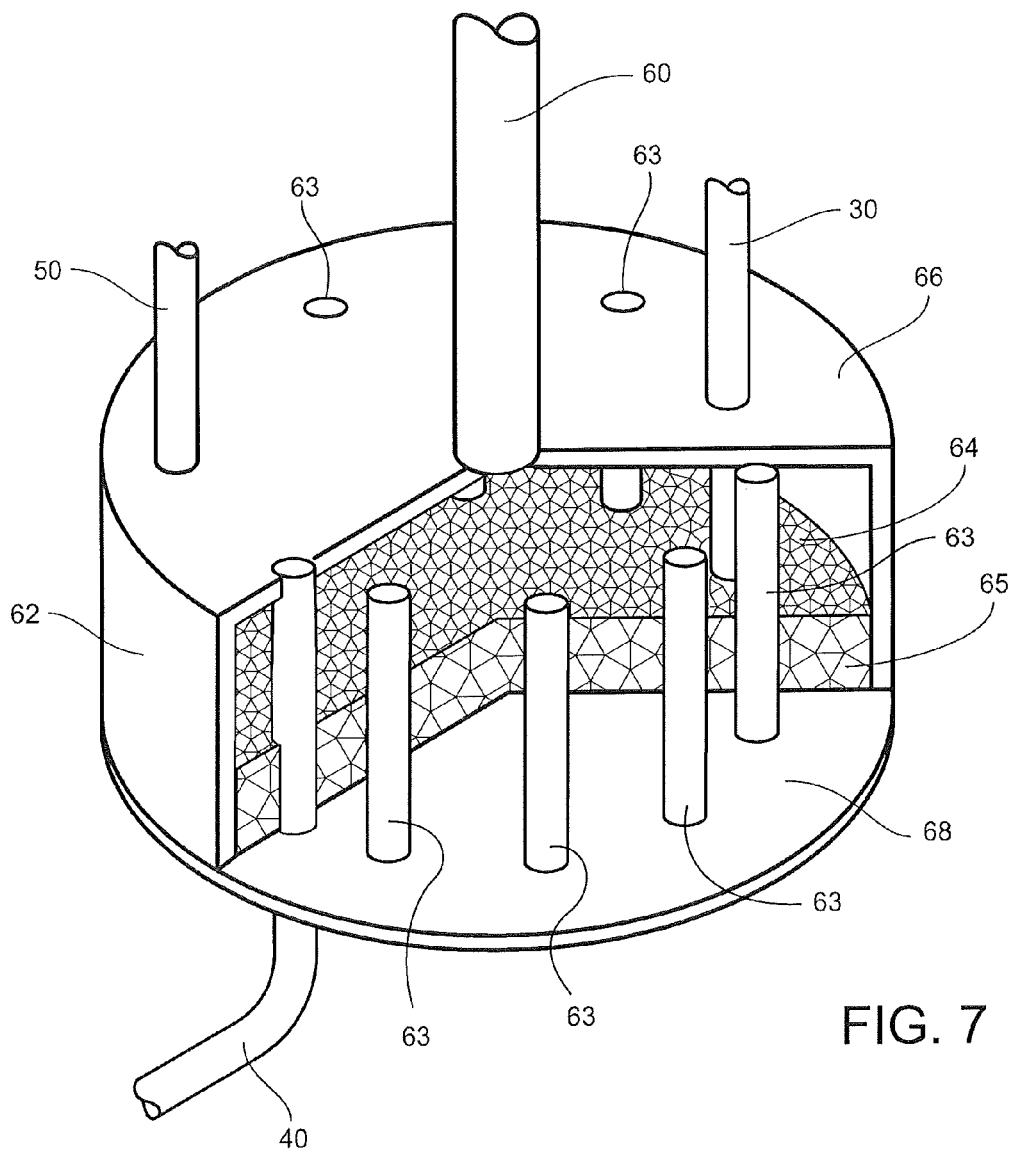
FIG. 7 is a cutaway view of the piston showing an embodiment of the piston with voids.

FIGS. 6 and 7 more particularly show embodiments of the piston 62. The piston 62 has top 66 and bottom 68. The vent 50 enters the piston 62 on the top as does the inlet 66. Likewise, the drain 40 exits the piston on the bottom side 68. The optional removable ballast 65 is located on adjacent the bottom 68 of the piston. The fluid 64 may be filled above the ballast 65. As shown in FIG. 7, in an alternate embodiment, void tubes 63 extend through the piston from the bottom 68 to the top 66. These void tubes 63 allow the fluid 22 in the tank 20 to pass through the piston. These void tubes 63 may allow the piston 62 to sink more quickly in the tank 20 and facilitate movement of the piston 62 and fluid 22 within the tank 20.

The foregoing has described a device 10 and for generating electricity using buoyancy. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A device for generating power using buoyancy comprising:
   a. a fluid column;
   b. a piston, residing inside the fluid column, having a substantially hollow interior capable of being filled with a fluid;
   c. a rod connected to the piston and extending above the fluid column;
   d. a power generator connected to the rod;
   e. wherein, the piston operates from a first position near the top of the fluid column to a second position near the bottom of the fluid column;
   f. wherein the piston moves from the first position to the second position as fluid is added to an inlet of the piston, and wherein the piston moves from the second position to the first position as a sealable outlet is actuated from a closed position to an open position; and
   g. wherein the piston further comprises a plurality of voids, extending from the bottom of the piston to the top piston, and having an open top and bottom for permitting fluid to flow.

2. The device for generating power using buoyancy of claim 1 wherein the piston further comprises ballast that is denser than the fluid.

3. The device for generating power using buoyancy of claim 1 wherein the power generator comprises a hydraulic cylinder connected to the rod, a hydraulic accumulator connected to the hydraulic cylinder, and a hydraulic generator connected to the hydraulic accumulator, wherein as the piston moves from the second position to the first position, the hydraulic cylinder is actuated which actuation charges the hydraulic accumulator with fluid, which charging powers the hydraulic generator creating electric power.

4. The device for generating power using buoyancy of claim 1 wherein the power generator comprises a set of gears operably connected to the rod and to a permanent magnet generator wherein as the piston moves from the second position to the first position, the rod actuates the gears which actuates the permanent magnet generator thereby generating electrical power.

5. The device for generating power using buoyancy of claim 1 wherein the sealable outlet is arranged to operate from the closed position to the open position as the piston reaches a predetermined position near the bottom of the fluid column, and wherein the inlet is arranged to operate from a non-filling position to a filling position as the piston reaches a predetermined position near the top of the fluid column.

6. The device for generating power using buoyancy of claim 1 wherein the fluid of the fluid column is water and wherein the fluid used to fill the piston is water.

7. The device for generating power using buoyancy of claim 1 wherein the fluid of the fluid column and the fluid used to fill the piston is selected from the group consisting of water, a petroleum, a glycol, and an oil derived from a plant.

8. The device for generating power using buoyancy of claim 1 wherein the piston is rigid and of sufficient structural integrity to resist deformation under a pressure exerted by the fluid column when the piston is in the second position.

9. The device for generating power using buoyancy of claim 1 wherein the piston is deformable such that the volume of the piston is at a largest extent when in the first position and at its smallest extent in the second position.

10. The device for generating power using buoyancy of claim 9 wherein the vent is sealable and the fluid used to fill the piston is warmed air which is warmed by a heat exchanger, the warmed air being circulated through a heat exchanger, causing the piston to cycle between the first and second position.

11. The device for generating power using buoyancy of claim 9 wherein the vent is sealable and the fluid used to fill the piston is compressed.

12. The device for generating power using buoyancy of claim 1 wherein the rod is hingedly attached to the piston.

13. A device for generating power using buoyancy comprising:
   a. a fluid column;
   b. a piston, residing inside the fluid column, having a substantially hollow interior capable of being filled with a fluid;
   c. a power generator connected to the piston;
   d. wherein, the piston operates from a first position near the top of the fluid column to a second position near the bottom of the fluid column;
   e. wherein the piston moves from the first position to the second position as fluid is added to an inlet of the piston, and wherein the piston moves from the second position to the first position as a sealable outlet is actuated from a closed position to an open position; and
   f. wherein the sealable outlet and the inlet each comprise an extensible water tight conduit.

14. The device for generating power using buoyancy of claim 13 wherein the water tight conduits each further comprise a storage reel wherein as the piston moves from the first position to the second position, the water tight conduit of the sealable outlet retracts about the reel and the water tight conduits of the inlet extends from the respective reels, and wherein as the piston moves from the second position to the first position, the water tight conduit of the sealable outlet extends from the real and the water tight conduits of the inlet retracts about the reel.

15. The device for generating power using buoyancy of claim 13 wherein the piston further comprises ballast that is denser than the fluid.

16. The device for generating power using buoyancy of claim 13 wherein the sealable outlet is arranged to operate from the closed position to the open position as the piston reaches a predetermined position near the bottom of the fluid column, and wherein the inlet is arranged to operate from a non-filling position to a filling position as the piston reaches a predetermined position near the top of the fluid column.

17. The device for generating power using buoyancy of claim 13 wherein the fluid of the fluid column is water and wherein the fluid used to fill the piston is water.

18. The device for generating power using buoyancy of claim 13 wherein the fluid of the fluid column and the fluid used to fill the piston is selected from the group consisting of water, a petroleum, a glycol, and an oil derived from a plant.

19. The device for generating power using buoyancy of claim 13 wherein the piston is rigid and of sufficient structural integrity to resist deformation under a pressure exerted by the fluid column when the piston is in the second position.

20. The device for generating power using buoyancy of claim 1 wherein the piston is deformable such that the volume of the piston is at a largest extent when in the first position and at its smallest extent in the second position.

* * * * *